United States Patent [19]

Kim

[11] Patent Number: 5,841,573

[45] Date of Patent: Nov. 24, 1998

[54] BACKWARD LIGHT CUTTING-OFF APPARATUS HAVING TRANSMITTING LIGHT DETECTING STAGES AND METHOD FOR DETECTING TRANSMITTING LIGHT USING THE APPARATUS

[75] Inventor: Yeong-Ju Kim, Gumi, Rep. of Korea

[73] Assignee: SamSung Electronic Co., Ltd., Kyungki-do, Rep. of Korea

[21] Appl. No.: 814,504

[22] Filed: Mar. 10, 1997

[30] Foreign Application Priority Data

Mar. 11, 1996 [KR] Rep. of Korea .................... 6343/1996

[51] Int. Cl.⁶ .............................. H01S 3/00; G02B 27/10; G02B 6/26
[52] U.S. Cl. ............................ 359/341; 359/618; 385/31; 385/24
[58] Field of Search .................................... 359/341, 618, 359/626; 385/31, 33, 35, 24

[56] References Cited

U.S. PATENT DOCUMENTS 5,377,287  12/1994  Lee et al. .
5,446,813  8/1995   Lee et al. .
5,479,541  12/1995  Pan .
5,524,153  6/1996   Laor .
5,594,821  1/1997   Cheng .
5,657,155  8/1997   Cheng ...................................... 359/341
5,689,595  11/1997  Pan ............................................ 385/27

*Primary Examiner*—Mark Hellner
*Attorney, Agent, or Firm*—Robert H. Bushnell, Esq.

[57] ABSTRACT

A optical isolator apparatus suppressing transmission of light in a backward direction having transmitting light detecting stages includes optical fibers respectively arranged at input and output stages without using optical distributers requiring a specifically-processed coating. The apparatus can be used for detecting transmitting light. In other words, without using optical taps requiring a specifically-processed coating. The apparatus includes a first detecting optical fiber adapted to receive multi-reflected light generated in the interior of the optical isolator apparatus and to detect input-stage detection light based on the multi-reflected light and, a first lens adapted to collimate the input signal light. An output optical fiber is adapted to transmit an output signal light. A second detecting optical fiber is adapted to detect backward light reflected from the output optical fiber and introduced again in the interior of the optical isolator apparatus.

23 Claims, 3 Drawing Sheets

BACKWARD LIGHT CUTTING-OFF APPARATUS HAVING TRANSMITTING LIGHT DETECTING STAGES AND METHOD FOR DETECTING TRANSMITTING LIGHT USING THE APPARATUS

BACKGROUND OF THE INVENTION

CLAIM OF PRIORITY

This application makes reference to, incorporates the same herein, and claims all benefits accruing under 35 U.S.C. §119 from an application entitled Backward Light Cutting-off Apparatus Having Transmitting Light Detecting Stages and Method for Detecting Transmitting Light Using the Apparatus earlier filed in the Korean Industrial Property Office on 11 Mar. 1996, and there duly assigned Ser. No. 6343/1996 by that Office.

1. Field of the Invention

The present invention relates to an apparatus suppressing transmission of light in a backward direction. More particularly, the present invention relates to an apparatus suppressing transmission of light in a backward direction having transmitting light detecting stages having optical fibers respectively arranged at input and output stages and adapted to detect states of input and output signals, thereby minimizing the instability of a laser source caused by the backward transmission of light, and to a method for detecting transmitting light using such an apparatus.

2. Description of the Related Art

The art of backward light cutting-off apparatus and the art of optical fibers are concerned with controlling the flow of light. The optical fiber art has at least several instances of improving the art so as to permit different directions of flow of light or to cut off directions of flow of light. Optical isolators are devices used to allow signals to propagate in a forward direction but not in a backward direction, thereby preventing unwanted back reflections from being transmitted back to a signal's source. Optical taps are devices used to remove a portion of an optical signal for monitoring. Among the exemplars of this contemporary practice are Cheng (U.S. Pat. No. 5,594,821, Integrated Optical Isolator, Jan. 14, 1997) discussing an integrated optical isolator arrangement "that is capable of isolating an input optical signal and coupling a pump signal." The coupler includes a pair of lenses with an isolator "disposed therebetween." A "wavelength selective device allows the input signal from the first input port to pass through it to a second output port, and in addition, reflects a pump signal transmitted on the second input port to the second output port for combination with the input optical signal." Laor (U.S. Pat. No. 5,524,153, Optical Fiber Switching System And Method Using Same, Jun. 4, 1996) discusses an optical fiber switching system "which includes two optically opposed groups of optical fiber switching units." The system "is capable of rapidly aligning any one of the optical fibers in any one of the switching units in one group with any one of the optical fibers in any one of the switching units in the other group in response to a command from an external source." Lee et al. (U.S. Pat. No. 5,446,813, Optical Isolator, Aug. 29, 1995) discusses an optical isolator "placed in the path of an input optical fiber and an output optical fiber." A rotator "is mounted between the first birefringent crystal wedge and the second birefringent crystal wedge so that the rays emitted from the input optical fiber can be recombined and focused into the output optical fiber, and the rays reflected from the output optical fiber will be diverged and cannot be refocused into the input optical fiber." Pan (U.S. Pat. No. 5,479,541, 1XN Electromechanical Optical Switch, Dec. 26, 1995) discusses an optical switch having a "first optical fiber" and a plurality of N optical fibers. The first optical fiber "forms an optical path with any of the N optical fibers by an alignment of a longitudinal axis of an end of the optical fiber with a longitudinal axis of an end of the one of N optical fibers." Lee et al. (U.S. Pat. No. 5,377,287, Fiber Optic Corporate Power Divider/Combiner And Method, Dec. 27, 1994) discusses a fiber optic "corporate power divider/combiner for use in fiber optic systems." The dielectric lens "optically aligned with the micro-lens receives and transforms the convergent spherical wave into parallel rays for transmission." From my study of these exemplars of the contemporary practice and the art, I find that there is a need for an effective and improved method and apparatus for cutting off backward light, having transmitting light detecting stages having optical fibers respectively arranged at input and output stages and adapted to detect states of input and output signals.

SUMMARY OF THE INVENTION

Therefore, an object of the present invention is to provide an improved apparatus for cutting off backward light.

A further object is to provide a backward light cutting-off apparatus having transmitting light detecting stages having optical fibers respectively arranged at input and output stages and adapted to detect states of input and output signals.

A yet further object is to provide a method for detecting transmitting light using such an apparatus.

Another object is to provide an improved backward light cutting-off apparatus eliminating the instability of a laser source caused by the backward flow of transmitting light.

Another object is to provide a backward light cutting-off apparatus having transmitting light detecting stages comprised of optical fibers respectively arranged at input and output stages without using a optical distributer requiring a specifically-processed coating, and to provide a method of detecting transmission of light using such an apparatus. In other words, without using an optical tap.

Another object of the invention is to provide a backward light cutting-off apparatus having transmitting light detecting stages capable of detecting transmitting light by use of multi-reflected light generated between an optical fiber and a lens, and to provide a method for detecting transmission of light using such an apparatus.

Another object of the invention is to provide a backward light cutting-off apparatus having transmitting light detecting stages and a method for detecting transmitting light using such an apparatus, so as to reduce the number of manufacturing processes and the manufacturing time.

Another object of the invention is to provide a backward light cutting-off apparatus having transmitting light detecting stages and a method for detecting transmitting light using such an apparatus, so as to prevent the multi-reflected light generated between an optical fiber and a lens from being fed back to input and output optical fibers respectively constituting the transmitting light detecting stages.

Another object of the invention is to provide a backward light cutting-off apparatus having transmitting light detecting stages and a method for detecting transmitting light using such an apparatus, so as to perform a backward light cutting-off function and a transmitting light detecting function in a simultaneous manner.

Another object of the invention is to provide a backward light cutting-off apparatus having transmitting light detecting stages while having no optical distributer, thereby being capable of achieving a reduction in the manufacturing costs and a compactness, and to provide a method for detecting transmitting light using such an apparatus. In other words, while having no optical tap.

To achieve these or other objects, the present invention provides a backward light cutting-off apparatus having an input optical fiber adapted to transmit input signal light to an output stage. The apparatus may include a first detecting optical fiber adapted to receive multi-reflected light generated in the interior of the backward light cutting-off apparatus and to detect input-stage detection light based on the multi-reflected light, a first ferrule adapted to firmly support both the input optical fiber and the first detecting optical fiber, and a first lens adapted to collimate the input signal light emerging from the input optical fiber. The apparatus may also include a first polarizer adapted to split the collimated input signal light into vertically and horizontally-polarized light beams, a polarized-light rotator adapted to shift the phases of the beams of the input signal light split by the first polarizer, and a second polarizer adapted to concentrate the split beams of the input signal light phase-shifted by the polarized-beam rotator. Further, the apparatus may include a second lens adapted to collimate the input signal light emerging from the second polarizer into an output optical fiber, the output optical fiber adapted to transmit an output signal light, and a second detecting optical fiber adapted to detect backward light produced by the output signal light reflected again from the output optical fiber and introduced again in the interior of the backward light cutting-off apparatus. This detects detection light at an output stage. A second ferrule firmly supports both the output optical fiber and the second detecting optical fiber.

To achieve these and other objects, the present invention provides a method for detecting transmitting light using a backward light cutting-off apparatus having the step of detecting the state of the input signal light. Such a detecting step may include converting a portion of the input signal light fed to the first lens by the input optical fiber into multi-reflected light between the input optical fiber and the first lens, introducing again the multi-reflected light into the first detecting optical fiber, and detecting the multi-reflected light as the input-stage detection light. The method may also include the step of detecting the state of the output signal light. Such a detecting step may include collimating the input signal light fed from the input optical fiber to the first lens while sequentially passing the input signal light through the first lens, the first polarizer, the polarized-light rotator, the second polarizer and the second leans, converting the collimated input signal light into output signal light, and transmitting the output signal light. Such a detecting step may also include reflecting again the output signal light by a medium in such a manner that the output signal light is backwardly introduced in the backward light cutting-off apparatus through the output optical fiber, partially converting the backward light into reflected light between the second lens and the output optical fiber, introducing again the reflected light in the second detecting optical fiber, and detecting the reflected light as the output-stage detection light.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
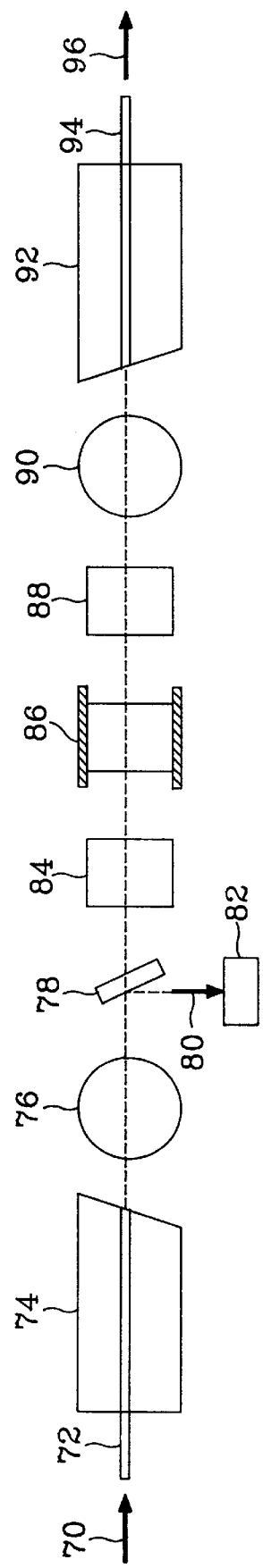
FIG. 1 is a schematic view illustrating a contemporary optical isolator apparatus which includes a monitoring photo-diode.

Turning now to the drawings, specifically referring to FIG. 1, a contemporary optical isolator apparatus is illustrated. The apparatus includes a monitoring photo-diode. As shown in FIG. 1, the optical isolator apparatus includes an input optical fiber 72 for transmitting input signal light 70 to an output stage. A first ferrule 74 supports and fixes the input optical fiber 72. A first lens 76 is arranged downstream from the first ferrule 74 so as to be able to collimate the input signal light 70. Downstream from the first lens 76, an optical tap 78 is arranged; this serves to reflect 1% of the input signal light 70 in order to detect the state of the input signal light 70. A detecting member 82 is disposed beneath the optical tap 78 to detect detection light 80 reflected from the optical tap 78. The optical tap 78 is a 99:1 optical tap; the optical tap 78 is provided with a particular coating to transmit a large portion (about 99%) of the input signal light 70 while reflecting a small portion (about 1%) of the input signal light 70.

Downstream from the optical tap 78, a first polarizer 84 is placed. The first polarizer 84 splits the input signal light 70 transmitted from the optical tap 78 into vertically and horizontally-polarized light beams. A polarized-light rotator 86 is disposed downstream from the first polarizer 84 to shift the phases of the beams of the input signal light 70 split by the first polarizer 84. A second polarizer 88 is arranged downstream from the polarized-beam rotator 86 to concentrate the split beams of the input signal light 70 phase-shifted by the polarized-beam rotator 86. Also, a second lens 90 is arranged downstream from the second polarizer 88 to collimate the input signal light 70 emerging from the second polarizer 88, into an output optical fiber 94. The output optical fiber 94 is disposed downstream from the second lens 90 to receive the input signal light 70 from the second lens 90, thereby outputting output signal light 96. A second ferrule 92 is disposed around the output optical fiber 94 to firmly support the output optical fiber 94.

Now, the operation of the contemporary optical isolator apparatus having the above-mentioned arrangement follows.

An input signal light 70, emitted from a light emitting element, such as a laser in an excited state, is first transmitted to the first lens 76 via the input optical fiber 72. During this transmission, the input signal light 70 is partially converted into multi-reflected light between the first ferrule 74 and the first lens 76.

Thereafter, the input signal light 70 is collimated by the first lens 76 and transmitted to the optical tap 78. The optical tap 78 transmits 99% of the input signal light 70 which is, in turn, sent to the first polarizer 84. 1% of the input signal light 70 is reflected as detection light 80 toward the detecting member 82. This is done by the optical tap 78 so that detecting member 82 can be used to detect the state of the input signal light 70.

The detecting member 82 detects the detection light 80, thereby detecting a variation in the state of the input signal light 70. At the same time, the input signal light 70 incident on the first polarizer 84 passes through the upper portion of the first polarizer 84. As a result, the input signal light 70 is split into vertically and horizontally-polarized light beams. The split light beams of the input signal light 70 emerging from the first polarizer 84 then pass through the polarized-beam rotator 86 which, in turn, shifts the phases of the light beams. The phase-shifted light beams of the input signal light 70 then pass through the second polarizer 88 which, in turn, concentrate the split beams. The second polarizer 88 then sends the resultant light to the output optical fiber 94 via the second lens 90. The output optical fiber 94 receives the input signal light 70 and then outputs the output signal light 96.

The above-mentioned isolator apparatus uses the optical tap 78 and the detecting member 82 to detect transmitting light in accordance with the above-mentioned method. Thus, it requires an increase in the number of manufacturing processes necessary for the manufacture of the apparatus. Furthermore, the costs increase because the optical tap 78 uses a particularly coated element. In order to detect transmitting light, the optical tap 78 transmits a large portion (99%) of the input signal light 70 while optionally reflecting a small portion (1%) of the input signal light 70 toward the detecting member 82. As a result, a portion of the input signal light 70 is unnecessarily consumed. Moreover, the process of the manufacturing of the optical tap 78 is carried out separately from the process of manufacturing the backward light cutting-off-apparatus. This results in an increase in the manufacturing time and a difficulty in the manufacture. In addition, the backward light cutting-off apparatus becomes bulky, degrading the appearance.

Figure 2:
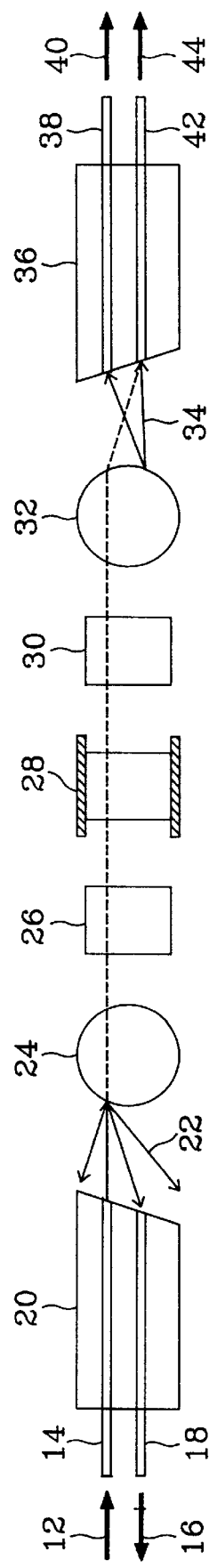
FIG. 2 is a schematic view illustrating an optical isolator apparatus according to an embodiment of the present invention.

FIG. 2 illustrates an optical isolator apparatus according to an embodiment of the present invention. As shown in FIG. 2, the optical isolator apparatus of the present invention includes an input optical fiber 14 adapted to transmit input signal light 12 to an output stage. A first detecting optical fiber 18 is arranged beneath the input optical fiber 14 and adapted to receive multi-reflected light 22 generated in the interior of the backward light cutting-off apparatus, thereby detecting input-stage detection light 16. The first detecting optical fiber 18 detects the multi-reflected light 22 which is reflected between the input optical fiber 14 and a first lens 24, thereby detecting the state of the input signal light 12 at the input stage.

A first ferrule 20 is arranged around the input optical fiber 14 and first detecting optical fiber 18. The first ferrule 20 firmly supports the input optical fiber 14 and first detecting optical fiber 18. A first lens 24 is arranged downstream from the first ferrule 20 while being spaced from the input optical fiber 14 by a focal distance to collimate the input signal light 12. Downstream from the first lens 24, a first polarizer 26 is arranged which splits the collimated input signal light 12 into vertically and horizontally-polarized light beams. A polarized-light rotator 28 is disposed downstream from the first polarizer 26 to shift the phases of the beams of the input signal light 12 split by the first polarizer 26. A second polarizer 30 is arranged downstream from the polarized-beam rotator 28 to concentrate the split beams of the input signal light 12 phase-shifted by the polarized-beam rotator 28. A second lens 32 is arranged downstream from the second polarizer 30 to collimate the input signal light 12 emerging from the second polarizer 30 into an output optical fiber 42. The output optical fiber 42 is disposed downstream from the second lens 32 to modulate the input signal light 12 emerging from the second lens 32 into an output signal light 44. A second detecting optical fiber 38 is disposed above the output optical fiber 42 to detect backward light produced by the output signal light 44 reflected again from the output optical fiber 42 and introduced again in the interior of the backward light cutting-off apparatus, thereby detecting detection light 40 at the output stage. In this case, the second detecting optical fiber 38 detects a portion of the backward light reflected again from the output stage and introduced again in the second detecting optical fiber 38, namely, light 34 reflected between the output optical fiber 42 and the second lens 32, thereby detecting the state of light reflected to the output stage and then fed to the backward light cutting-off apparatus.

A second ferrule 36 is disposed around both the output optical fiber 42 and second detecting optical fiber 38 to firmly support them. Thus, the first and second detecting optical fibers 18 and 38 are arranged at the input and output stages, respectively.

The operation of the optical isolator apparatus having the above-mentioned arrangement according to the present invention follows.

An input signal light 12, which is emitted from a light emitting element, such as a laser in an excited state, is first transmitted to the first lens 24 via the input optical fiber 14. During this transmission, the input signal light 12 is partially converted into multi-reflected light 22 between the first ferrule 20 and the first lens 24.

Thereafter, the multi-reflected light 22 is introduced into the first detecting optical fiber 18 which, in turn, detects the introduced multi-reflected light as detection light 16 at the input stage, thereby detecting the state of the input signal light 12 at the input stage. At the same time, the input signal light 12 is collimated by the first lens 24 and is transmitted to the first polarizer 26.

The input signal light 12 incident on the first polarizer 26 then passes through the upper portion of the first polarizer 26. As a result, the input signal light 12 is split into vertically and horizontally-polarized light beams.

The split light beams of the input signal light 12 emerging from the first polarizer 26 then pass through the polarized-beam rotator 28 which, in turn, shifts the phases of the light beams.

The phase-shifted light beams of the input signal light 12 then pass through the second polarizer 30 which, in turn, concentrate the split beams. The second polarizer 30 then sends the resultant light to the output optical fiber 42 via the second lens 32. The output optical fiber 42 receives the input signal light 12 and then outputs the output signal light 44.

Subsequently, the output signal light 44 is reflected again by a medium and then introduced again in the interior of the optical isolator apparatus via the output optical fiber 42.

The re-introduced backward light is then partially converted into reflected light 34 between the second lens 32 and output optical fiber 42.

Thereafter, the reflected light 34 enters the second detecting optical fiber 38, so that it is detected as detection light 40 at the output stage. Thus, the state of light fed to the backward light cutting-off apparatus is detected. The apparatus shown in FIG. 2 effectively transmits incoming optical signals from input optical fiber 14 to output optical fiber 42, while blocking the transmission of light from output optical fiber 42 to input optical fiber 14.

Figure 5:
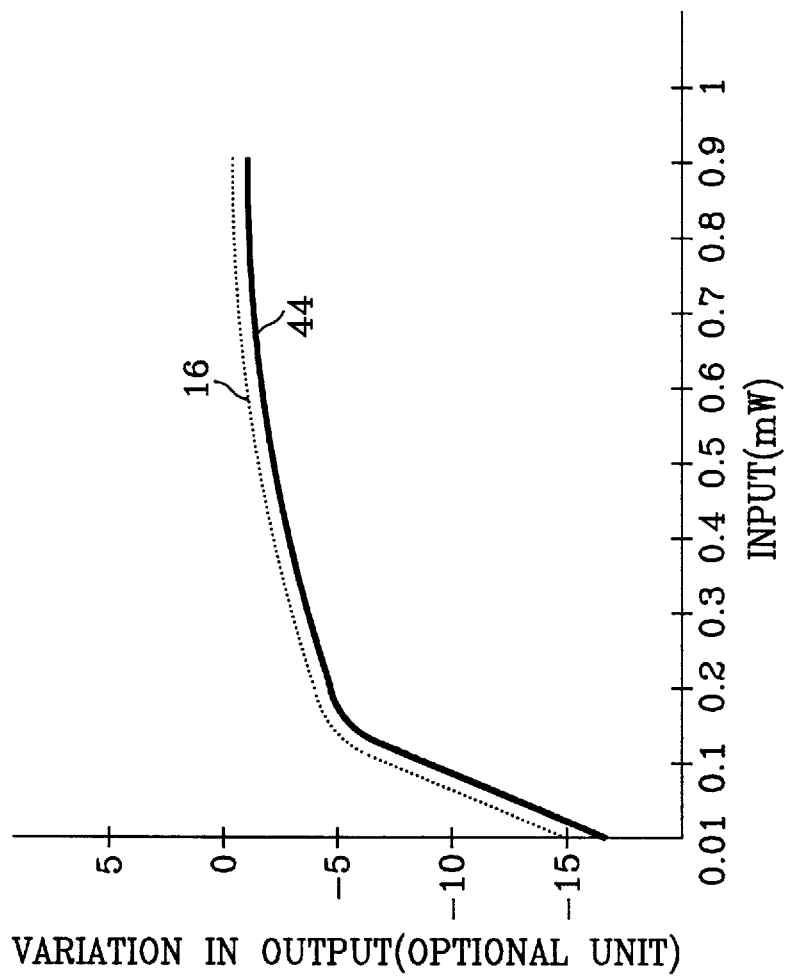
FIG. 5 is a graph illustrating a variation in the detection signal, reflected by a lens and then output at a detection stage, depending on the magnitude of input light in the optical isolator apparatus of the present invention.

Referring to FIG. 5, a graph is shown which depicts a variation in the detected light, which is reflected by a lens and then output at the detection stage, depending on the magnitude of input light in the optical isolator apparatus of the present invention. Input stage detection light 16 and output signal light 44 are shown.

Figure 3:
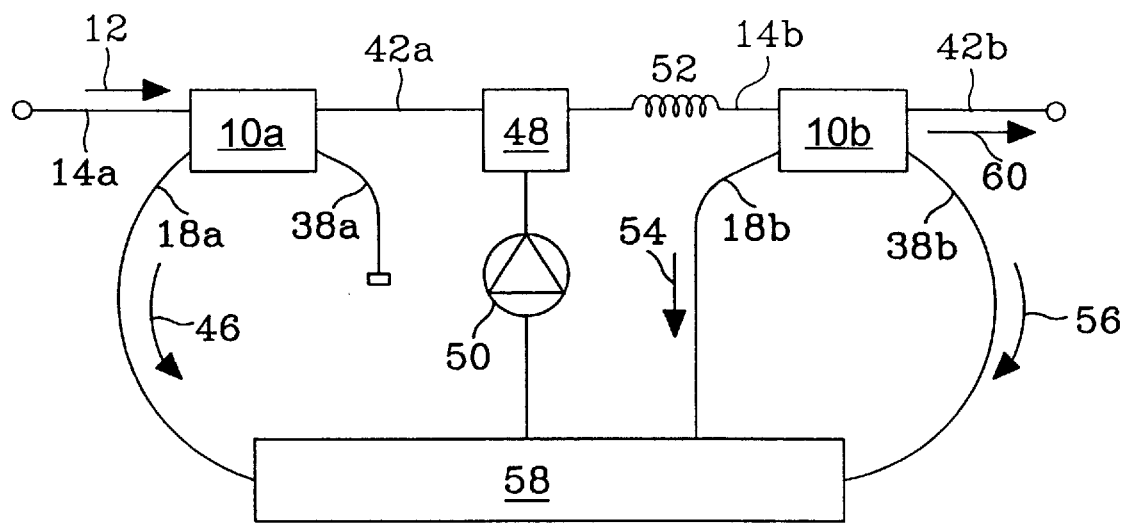
FIGS. 3 and 4 are circuit diagrams illustrating optical amplifiers in which the optical isolator apparatus of the present invention is incorporated.

FIG. 3 is a schematic view illustrating an optical amplifier in which the optical isolator apparatus of the present invention is incorporated.

Now, the optical amplifier will be described in conjunction with FIG. 3. As shown in FIG. 3, the optical amplifier includes an input-stage optical isolator unit 10a coupled to an input stage of the optical amplifier and an output-stage optical isolator unit 10b coupled to an output stage of the optical amplifier. Unit 10a shown in FIG. 3 represents the optical isolator illustrated in FIG. 2. Also, unit 10b shown in FIG. 3 represents the optical isolator illustrated in FIG. 2. The optical amplifier also includes a first input optical fiber 14a adapted to receive input signal light 12 from the input stage and to transmit the input signal light 12 toward the output stage via the input-stage isolator unit 10a, and a first detecting optical fiber 18a adapted to transmit a signal indicative of the state of the input signal light 12 output from the input-stage isolator unit 10a as a first detection-stage output 46 to a control unit 58. The optical amplifier further includes a first output optical fiber 42a adapted to transmit the input signal light 12 output from the input-stage backward light cutting-off unit 10a to a wavelength-division multiplexer 48, and a third detecting optical fiber 38a adapted to transmit signal light reflected again from the first output optical fiber 42a toward the input-stage isolator unit 10a in an amplified state toward the control unit 58. The first detecting optical fiber 18a is connected to the control unit 58 whereas the third detecting optical fiber 38a is not connected to the control unit 58.

The optical amplifier includes a pumping laser 50 for amplifying the input signal light 12 when the input signal light 12 is weak. The pumping laser 50 supplies light energy. The pumping laser 50 can be replaced by a substitute source of a pump signal. The optical amplifier also includes the wavelength division multiplexer 48 couples an optical signal having a first wavelength emitted from the pumping laser 50 along with the input signal light 12 having a second wavelength and. An amplifying fiber 52 is coupled to the wavelength division multiplexer 48 to amplify an output signal from the wavelength division multiplexer 48.

The optical amplifier further includes a second input optical fiber 14b adapted to transmit the amplified optical signal from the amplifying fiber 52 to the output-stage isolator unit 10b, a second detecting optical fiber 18b adapted to transmit a signal indicative of the gain state of the amplified fiber 52 as the second detection-stage output 54 to the control unit 58. The optical amplifier also includes a second output optical fiber 42b adapted to transmit the amplified output light "60" to the output stage of the optical amplifier, and a fourth detecting optical fiber 38b adapted to transmit a signal indicative of the state of signal light reflected again from the second output optical fiber 42b toward the output-stage isolator unit 10b as a third detection-stage output 56 to the control unit 58. Both the second detecting optical fiber 18b and fourth detecting optical fiber 38b are connected to the control unit 58.

The control unit 58 serves to detect the first, second and third detection-stage outputs 46, 54 and 56, thereby detecting a variation in gains of those outputs and a variation in the state of the optical signal. When such a variation occurs, the control unit 58 carries out an electrical control to drive the pumping laser source 50.

The operation of the optical amplifier having the above-mentioned arrangement will now be described.

An input signal light 12 is first transmitted to the input-stage isolator unit 10a via the first input optical fiber 14a. The input-stage isolator unit 10a sends a signal indicative of the state of the input signal light 12 as a first detection-stage output 46 to the control unit 58 via the first detecting optical fiber 18a. When the input signal light 12 is weak, the control unit 58 drives the pumping laser 50 which, in turn, generates an optical signal. The optical signal from the pumping laser 50 is transmitted to the wavelength division multiplexer 48.

The input signal light 12, which passes through the input-stage isolator unit 10a, is coupled in the wavelength division multiplexer 48 along with the optical signal output from the pumping laser 50. The resultant light is fed to the amplifying fiber 52.

The signal light is amplified while passing through the amplifying fiber 52. Thereafter, the amplified signal light passes through the output-stage isolator unit 10b connected to the output stage. The output-stage isolator unit 10b then outputs the signal light as amplified output light 60 via the second output optical fiber 42b.

At this time, the state of the amplified optical signal is transmitted as a second detection-stage output 54 to the control unit 58 via the second detecting optical fiber 18b. The control unit 58 also receives, as a third detection-stage output 56, a signal indicative of the state of reflected light introduced again in the output-stage isolator unit 10b via the second output optical fiber 42b. When the control unit 58 receives the third detection-stage output 56, it drives the pumping laser 50 which, in turn, sends an optical signal to the wavelength division multiplexer 48.

Figure 4:
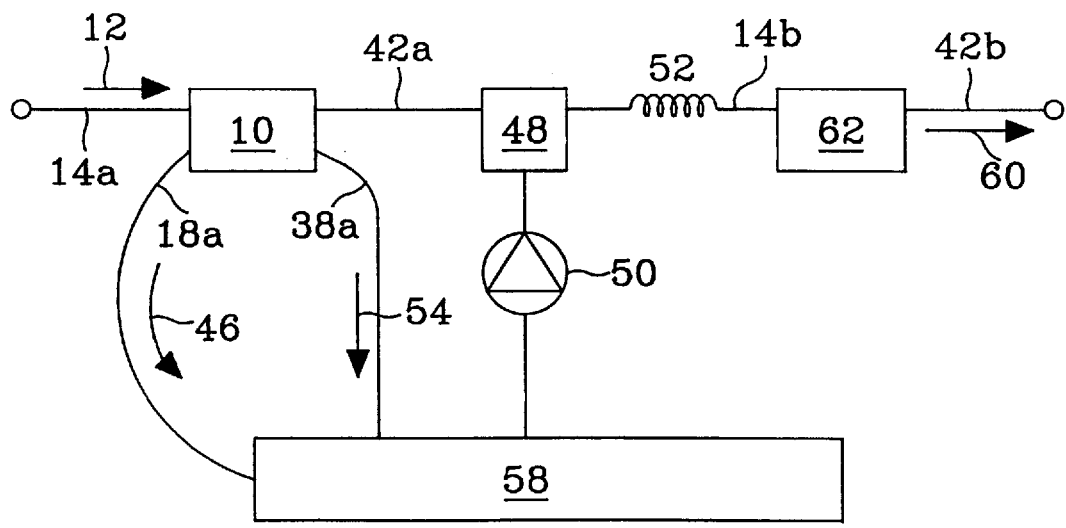

FIG. 4 is a schematic view illustrating another optical amplifier in which the optical isolator apparatus of the present invention is incorporated.

This optical amplifier will now be described in conjunction with FIG. 4. In FIG. 4, elements respectively corresponding to those in FIG. 3 are denoted by the same reference numerals. As shown in FIG. 4, the optical amplifier includes an optical isolator unit 10 coupled to an input stage of the optical amplifier. Unit 10 shown in FIG. 4 represents the optical isolator illustrated in FIG. 2. The optical amplifier also includes a first input optical fiber 14a adapted to receive input signal light 12 from the input stage of the optical amplifier and to transmit the input signal light 12 toward the output stage of the optical amplifier via the isolator unit 10, and a first detecting optical fiber 18a adapted to transmit a signal indicative of the state of the input signal light 12 as a first detection-stage output 46 to a control unit 58. The optical amplifier also includes a first output optical fiber 42a adapted to transmit the input signal light 12 to a wavelength division multiplexer coupler 48, and a second detecting optical fiber 38a adapted to transmit signal light reflected again from the first output optical fiber 42a toward the isolator unit 10 in an amplified state as a second detection-stage output 54 to the control unit 58. Both the first and second detecting optical fibers 18a and 38a are connected to the control unit 58.

The optical amplifier further includes a pumping laser 50 for amplifying the input signal light 12 when the input signal light 12 is weak. The wavelength division multiplexer 48 is also included in the optical amplifier. The wavelength division multiplexer 48 couples an optical signal having a first wavelength emitted from the pumping laser 50 along with the input signal light 12 having a second wavelength and transmits the resultant coupled signal. An amplifying fiber 52 is coupled to the wavelength-division multiplexed 48 to amplify an output signal from the wavelength-dividing coupler 48.

The optical amplifier further includes an optical system 62, a second input optical fiber 14b adapted to transmit the amplified optical signal from the amplifying fiber 52 to the optical system 62, and a second output optical fiber 42b adapted to transmit the amplified output light 60 to the output stage of the optical amplifier.

The control unit 58 serves to detect the first and second detection-stage outputs 46 and 54, thereby detecting a variation in gains of the outputs and a variation in the state of the optical signal. When a variation occurs, the control unit 58 carries out an electrical control to drive the pumping laser 50.

The operation of the optical amplifier having the above-mentioned arrangement will now be described.

An input signal light 12 is introduced in the input optical fiber 14a which, in turn, sends the input signal light 12 to the isolator unit 10. The isolator unit 10 sends a signal indicative of the state of the input signal light 12 as a first detection-stage output 46 to the control unit 58 via the first detecting optical fiber 18a. When the input signal light 12 is weak, the control unit 58 drives the pumping laser 50 which, in turn, generates an optical signal. The optical signal from the pumping laser 50 is transmitted to the wavelength division multiplexer 48.

The input signal light 12, which passes through the input-stage isolator unit 10, is coupled in the wavelength division multiplexer 48 along with the optical signal output from the pumping laser 50. The resultant light is fed to the amplifying fiber 52.

The signal light is amplified while passing through the amplifying fiber 52. Thereafter, the amplified signal light passes through the optical system 62 connected to the output stage. The optical system 62 then outputs the signal light as amplified output light 60 via the second output optical fiber 42b.

At this time, the state of the amplified optical signal is transmitted as a second detection-stage output 54 to the control unit 58 via the second detecting optical fiber 38a. When the control unit 58 receives the second detection-stage output 54, it drives the pumping laser 50 which, in turn, sends an optical signal to the wavelength division multiplexer 48.

As apparent from the above description, the optical isolator apparatus of the present invention can have two detection stages. As compared to the contemporary isolator apparatus, this saves money because there is an increase in detection stages without a commensurate increase in manufacturing costs. In this regard, the optical insulator apparatus of the present invention gives high competitiveness in business. In particular, the optical isolator apparatus of the present invention has no light distributer, thereby reducing the number of manufacturing or assembling processes. In other words, the present invention has no optical tap. Accordingly, it is possible to achieve an improvement in productivity. Furthermore, the optical isolator apparatus of the present invention has an improvement in compactness, thereby obtaining a good appearance. Where the optical isolator apparatus is incorporated in a light amplifier, it provides a positive effect in that it can be incorporated in either input or output stages of the light amplifier, or both input and output stages.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical amplifier, comprising:

an input optical fiber transmitting an input signal light to an output-stage in a forward direction, the input signal light being transmitted in the forward direction when the input signal light is transmitted in a direction from the input optical fiber to the output-stage;

a first detecting optical fiber transmitting a first detection-stage signal indicating a state of the input signal light to a control unit;

an input-stage isolator unit suppressing transmission in a backward direction of the input signal light, the backward direction being opposite to the forward direction;

an excited light source amplifying the input signal light when the input signal light is weaker than a predetermined level;

a wavelength division multiplexer receiving an optical signal having a first wavelength emitted from the excited light source when the input signal light is weaker than the predetermined level, receiving the input signal light from the input-stage backward cutting-off unit having a second wavelength, coupling the received optical signal and input signal light to form a coupled signal, and outputting the coupled signal in the forward direction; an amplifying fiber amplifying the coupled signal received from the wavelength division multiplexer, and outputting an amplified optical signal in the forward direction;

a second detecting optical fiber transmitting a second detection-stage signal, indicating a gain state of the amplified optical signal, to the control unit;

an output-stage backward light cutting-off unit suppressing transmission in the backward direction of the amplified optical signal, and receiving the amplified optical signal from the amplifying fiber;

an output optical fiber receiving the amplified optical signal from the output-stage backward light cutting-off unit and transmitting the amplified optical signal to the output-stage;

a third detecting optical fiber transmitting a third detection-stage signal, indicating a state of light reflected from the output optical fiber toward the output-stage backward light cutting-off unit, to the control unit; and the control unit detecting the first, second and third detection-stage signals, and controlling the excited light source.

2. The optical amplifier of claim 1, wherein the first detection-stage signal is transmitted from the input-stage backward light cutting-off unit to the control unit, and the second and third detection-stage signals are transmitted from the output-stage backward light cutting-off unit to the control unit.

3. The optical amplifier of claim 1, wherein the control unit uses an electrical signal to drive the excited light source.

4. The optical amplifier of claim 2, wherein the control unit uses an electrical signal to drive the excited light source.

5. An optical amplifier comprising:

an input optical fiber transmitting input signal light to an output-stage in a forward direction, the input signal light being transmitted in the forward direction when the input signal light is transmitted in a direction from the input optical fiber to the output-stage;

a first detecting optical fiber transmitting a first detection-stage signal, indicating a state of the input signal light, to a control unit;

a backward light cutting-off apparatus suppressing a transmission of the input signal light in a backward direction opposite to the forward direction;

a first output optical fiber transmitting in the forward direction the input signal light passing through the backward light cutting-off apparatus;

an excited light source amplifying the input signal light when the input signal light is weaker than a predetermined level;

a wavelength division multiplexer coupling an optical signal emitted from the excited light source with the input signal light received from the backward light cutting-off apparatus, and outputting a coupled signal in the forward direction;

an amplifying fiber amplifying the coupled signal received from the wavelength division multiplexer and outputting an amplified signal in the forward direction;

a second detecting optical fiber transmitting a second detection-stage signal, indicating a state of light reflected from the first output optical fiber, to the control unit;

an optical system cutting off a transmission in the backward direction of the amplified signal received from the amplifying fiber;

a second output optical fiber transmitting the amplified signal received from the optical system to an output-stage; and the control unit adapted to detect the first and second detection-stage signals, and controlling the excited light source.

6. The optical amplifier of claim 5, wherein the first and second detection-stage signals are transmitted from the backward light cutting-off unit to the control unit.

7. The optical amplifier of claim 6, wherein the control unit utilizes an electrical control to drive the excited light source.

8. The optical amplifier of claim 5, wherein the control unit utilizes an electrical control to drive the excited light source.

9. The optical amplifier of claim 5, wherein the backward light cutting-off apparatus comprises:

a primary input optical fiber transmitting input signal light to a primary output-stage;

a primary detecting optical fiber apparatus receiving multi-reflected light generated in an interior of the backward light cutting-off apparatus and detecting input-stage detection light upon receiving the multi-reflected light;

a first support unit supporting the primary input optical fiber and the primary detecting optical fiber apparatus;

a first lens collimating the input signal light emerging from the primary input optical fiber in the forward direction;

a primary output optical fiber transmitting an output signal light upon receiving, the input signal light;

a secondary detecting optical fiber apparatus receiving and detecting backward light reflected from the primary output optical fiber and introduced into the interior of the backward light cutting-off apparatus, and detecting detection light at the apparatus output-stage; and a second support unit supporting the primary output optical fiber and the secondary detecting optical fiber apparatus.

10. A backward light cutting-off apparatus, comprising:

an input optical fiber transmitting input signal light to an output-stage;

a first detecting optical fiber receiving multi-reflected light generated in an interior of the apparatus and detecting input-stage detection light upon receiving the multi-reflected light;

a first ferrule supporting the input optical fiber and the first detecting optical fiber;

a first lens collimating the input signal light emerging from the input optical fiber;

an output optical fiber transmitting an output signal light upon receiving the input signal light;

a second detecting optical fiber detecting backward light reflected from the output optical fiber and introduced into the interior of the apparatus, and detecting detection light at the output stage; and a second ferrule supporting the output optical fiber and the second detecting optical fiber.

11. The apparatus of claim 10, wherein the first and second detecting optical fibers are respectively located at the input stage and the output stage.

12. The apparatus of claim 10, wherein the first detecting optical fiber detects the state of the input signal light at the input stage, and the second detecting optical fiber detects the state of light reflected from the output stage and conveyed to the apparatus.

13. The apparatus of claim 10, wherein the first detecting optical fiber detects the input stage detection light, by receiving the multi-reflected light reflected between the input optical fiber and the lens.

14. The apparatus of claim 12, wherein the first detecting optical fiber detects the input stage detection light, by receiving the multi-reflected light reflected between the input optical fiber and the lens.

15. The apparatus of claim 10, wherein the second detecting optical fiber detects the output stage detection light, by receiving a portion of the backward light reflected from the output stage and introduced in the second detecting optical fiber.

16. The apparatus of claim 12, wherein the second detecting optical fiber detects the output stage detection light, by receiving a portion of the backward light reflected from the output stage and introduced in the second detecting optical fiber.

17. The apparatus of claim 10, further comprising;

a first polarizer splitting the input signal light collimated by the first lens into vertically-polarized light beams and horizontally-polarized light beams;

a polarized light phase rotator shifting phases of the vertically-polarized light beams of the input signal light and the horizontally-polarized light beams split by the first polarizer;

a second polarizer concentrating the light beams phase-shifted by the polarized light phase rotator; and a second lens collimating the input signal light emerging from the second polarizer into an output optical fiber.

18. The apparatus of claim 17, wherein the first detecting optical fiber detects the state of the input signal light at the input stage, and the second detecting optical fiber detects the state of light reflected from the output stage and conveyed to the apparatus.

19. The apparatus of claim 17, wherein the second detecting optical fiber detects the output stage detection light, by receiving light reflected between the output optical fiber and the second lens.

20. The apparatus of claim 18, wherein the second detecting optical fiber detects the output stage detection light, by receiving light reflected between the output optical fiber and the second lens.

21. A method for detecting transmitting light using the backward light cutting-off apparatus of claim 10, comprising the steps of:

detecting the state of the input signal light by:
    converting a portion of the input signal light conveyed to the first lens by the input optical fiber into the multi-reflected light between the input optical fiber and the first lens,
    introducing the multi-reflected light into the first detecting optical fiber, and detecting the multi-reflected light; and detecting the state of the output signal light by:
    collimating the input signal light conveyed from the input optical fiber to the first lens while sequentially passing the input signal light through the first lens, the first polarizer, the polarized light phase rotator, the second polarizer and the second lens, converting the collimated input signal light into output signal light, and transmitting the output signal light,
    reflecting the output signal light by a medium to backwardly introduce the output signal light into the backward light cutting-off apparatus through the output optical fiber,
    partially converting the backward light into reflected light between the second lens and the output optical fiber,
    introducing the reflected light in the second detecting optical fiber, and detecting the reflected light.

22. A method for detecting transmitting light using the backward light cutting-off apparatus of claim 10, comprising the steps of:

detecting the state of the input signal light by:
    converting a portion of the input signal light conveyed to the first lens by the input optical fiber into the multi-reflected light between the input optical fiber and the first lens,
    introducing the multi-reflected light into the first detecting optical fiber, and detecting the multi-reflected light; and detecting the state of the output signal light by:
    collimating the input signal light conveyed from the input optical fiber to the first lens while sequentially passing the input signal light through the first lens, the first polarizer, the polarized light phase rotator, the second polarizer and the second lens, converting the input signal light into the output signal light, and transmitting the output signal light,
    reflecting the output signal light by a medium to backwardly introduce the output signal light into the backward light cutting-off apparatus through the output optical fiber,
    partially converting the backward light into reflected light between the second lens and the output optical fiber, introducing the reflected light in the second detecting optical fiber, and detecting the reflected light.

23. A method for detecting transmitting light using a backward light cutting-off apparatus, comprising the steps of:

detecting a state of input signal light by:
    converting a portion of the input signal light conveyed to the first lens by an input optical fiber into multi-reflected light between the input optical fiber and a first lens,
    introducing the multi-reflected light into a first detecting optical fiber, and detecting the multi-reflected light; and detecting a state of output signal light by:
    collimating the input signal light conveyed from the input optical fiber to the first lens while sequentially passing the input signal light through the first lens, a first polarizer, a polarized light phase rotator, a second polarizer and a second lens, converting the input signal light into the output signal light, and transmitting the output signal light,
    reflecting the output signal light by a medium to backwardly introduce the output signal light into the backward light cutting-off apparatus through an output optical fiber, partially converting the backward light into reflected light between the second lens and the output optical fiber,
    introducing the reflected light in a second detecting optical fiber, and detecting the reflected light.

* * * * *